United States Patent
Lou et al.

(10) Patent No.: US 10,914,467 B2
(45) Date of Patent: Feb. 9, 2021

(54) METHOD AND APPARATUS FOR REHEAT STEAM TEMPERATURE CONTROL OF OXY-FIRED BOILERS

(71) Applicant: General Electric Technology GmbH, Baden (CH)

(72) Inventors: Xinsheng Lou, West Hartford, CT (US); Jundong Zhang, Bloomfield, CT (US); Shu Zhang, Windsor Locks, CT (US); Greg N. Liljedahl, Tariffville, CT (US); Bruce W. Wilhelm, Enfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 780 days.

(21) Appl. No.: 13/759,151

(22) Filed: Feb. 5, 2013

(65) Prior Publication Data

US 2014/0216364 A1 Aug. 7, 2014

(51) Int. Cl.
*F22G 5/02* (2006.01)
*F22B 35/18* (2006.01)
(Continued)

(52) U.S. Cl.
CPC .............. *F22G 5/02* (2013.01); *F22B 35/002* (2013.01); *F22B 35/18* (2013.01); *F22G 5/20* (2013.01); *F23L 7/007* (2013.01); *Y02E 20/34* (2013.01)

(58) Field of Classification Search
CPC .......... F22B 35/002; F22B 35/18; F22G 5/00; F22G 5/02; F23L 7/007; Y02E 20/34
(Continued)

(56) References Cited

U.S. PATENT DOCUMENTS

| | | | |
|---|---|---|---|
| 2,966,896 A | 1/1961 | Vogler | |
| 4,377,134 A * | 3/1983 | Frey | F22G 5/02 122/479.3 |

(Continued)

FOREIGN PATENT DOCUMENTS

| | | |
|---|---|---|
| CN | 102012017 A | 4/2011 |
| GB | 1049280 | 11/1966 |

(Continued)

*Primary Examiner* — Steven B McAllister
*Assistant Examiner* — Benjamin W Johnson
(74) *Attorney, Agent, or Firm* — Grogan, Tuccillo & Vanderleeden, LLP

(57) ABSTRACT

Method and system for adjusting a measured reheat outlet steam temperature ("$R_{PV}$") to approximate a reheat outlet steam temperature setpoint ("$R_{SP}$") in a boiler. An $R_{PV}$ is compared to an $R_{SP}$. If the $R_{PV}$ is less than the $R_{SP}$ and a position of a fuel nozzle tilt ("$TILT_{PV}$") is below a high limit of the fuel nozzle tilt ("$TILT_{HIGH}$"), the $TILT_{PV}$ is increased while a flow rate of a secondary flue gas recirculation ("$SFGR_{PV}$") is kept constant. If the $R_{PV}$ is less than the $R_{SP}$ and the $TILT_{PV}$ is at the $TILT_{HIGH}$, the $SFGR_{PV}$ is increased. If the $R_{PV}$ is greater than the $R_{SP}$ and the $SFGR_{PV}$ is greater than a low limit of flow rate of the SFGR ("$SFGR_{LOW}$"), the $SFGR_{PV}$ is decreased, while the $TILT_{PV}$ is kept constant. If the $R_{PV}$ is greater than the $R_{SP}$ and the $SFGR_{PV}$ is at the $SFGR_{LOW}$, the $TILT_{PV}$ is decreased.

6 Claims, 4 Drawing Sheets

(51) Int. Cl.
*F22B 35/00* (2006.01)
*F22G 5/20* (2006.01)
*F23L 7/00* (2006.01)

(58) Field of Classification Search
USPC ..... 122/479.1, 479.2, 479.3, 479.4; 110/341, 110/344
See application file for complete search history.

(56) References Cited

U.S. PATENT DOCUMENTS

| | | | | |
|---|---|---|---|---|
| 5,027,751 A | * | 7/1991 | Archer | F22B 35/18 122/390 |
| 5,181,482 A | * | 1/1993 | Labbe | F22B 37/56 122/379 |
| 6,454,562 B1 | * | 9/2002 | Joshi | C03B 5/2353 432/146 |
| 2008/0302102 A1 | | 12/2008 | Cheng et al. | |

FOREIGN PATENT DOCUMENTS

| | | | |
|---|---|---|---|
| JP | 11351512 A | * | 12/1999 |
| JP | 2009156553 A | | 7/2009 |

* cited by examiner

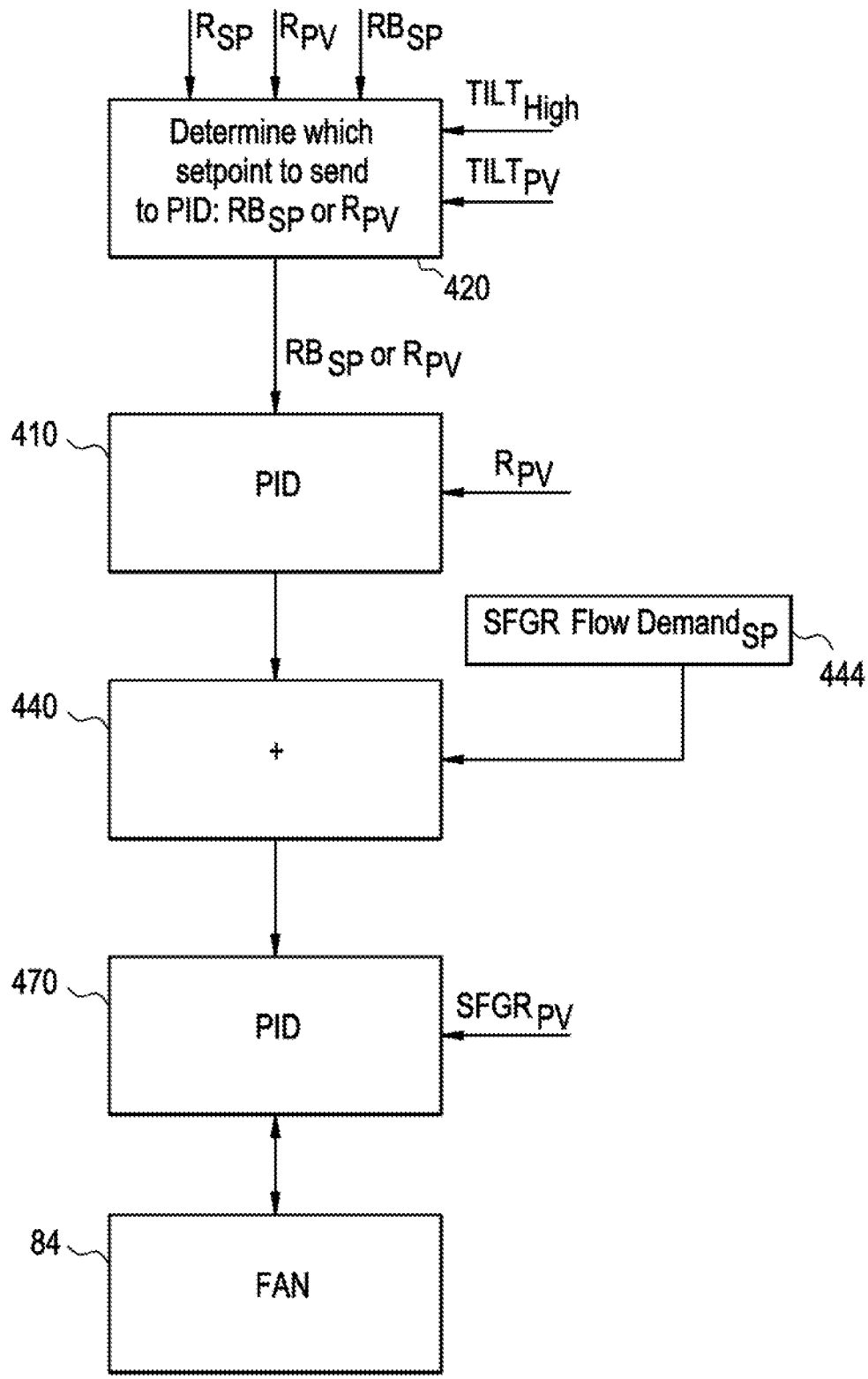

METHOD AND APPARATUS FOR REHEAT STEAM TEMPERATURE CONTROL OF OXY-FIRED BOILERS

GOVERNMENT LICENSE RIGHTS

This invention was made with government support under Contract DE NT-0005290 awarded by the US Department of Energy. The government has certain rights to the invention.

FIELD OF THE DISCLOSURE

The present disclosure relates to methods and systems for reheat outlet steam temperature control in a steam generating boiler. More specifically, the present disclosure relates to methods and systems for controlling multiple control handles for reheat steam temperature control in a steam generating boiler.

BACKGROUND OF THE DISCLOSURE

In a power plant using steam as a working fluid, operation of the plant may be modeled on a temperature setpoint of steam exiting a portion of the system and prior to entering one or more turbines of the plant. This setpoint may be referred to as the reheat outlet steam temperature. An actual temperature of the reheat steam at this point in the system may be referred to as the measured reheat outlet steam temperature and is abbreviated as $R_{PV}$, where subscript PV indicates a process variable as compared to set point. By comparing the $R_{PV}$ with a set point for the reheat outlet steam temperature ("$R_{SP}$") it is possible to adjust one or more control handles in the power plant system to minimize deviations of the $R_{PV}$ from the $R_{SP}$.

Oxy-fired power plants, i.e. power plants that use substantially pure oxygen as opposed to atmospheric air, are being developed. Some power plants may be referred to as dual fired plants because they may run on air or substantially pure oxygen, or a combination thereof. Reheat steam temperature controls for dual fired (air/oxy firing) present new problems because new control handles are presented. In such a system, control handles may include the attemperator spray water control, the fuel nozzle tilt control, the secondary flue gas recirculation ("SFGR") control in the oxy-firing mode or the excess air level control in the air-firing mode. Each of these controls can be adjusted to affect the $R_{PV}$. These controls, among others, may be coordinated to control the $R_{PV}$ to minimize deviations from $R_{SP}$ and/or to improve system efficiency and reduce the auxiliary power consumption.

There is a need for a power plant control system and method that coordinates one or more of the attemperator spray water control, the fuel nozzle tilt control, and the secondary flue gas recirculation control to achieve efficient plant operation. There is also a need for a power plant control system and method that coordinates one or more of the attemperator spray water control, the fuel nozzle tilt control, the SFGR control, and the excess air level control to enable safe and stable operation in mode transitions between an air-firing mode and an oxy-firing mode.

SUMMARY OF THE DISCLOSURE

According to aspects illustrated herein, there is provided a method of adjusting a measured reheat outlet steam temperature ("$R_{PV}$") to approximate a steam reheat outlet temperature setpoint ("$R_{SP}$") in a steam generating boiler. The method includes the steps of comparing an $R_{PV}$ to an $R_{SP}$. If the $R_{PV}$ is less than the $R_{SP}$ and a position of a fuel nozzle tilt ("$TILT_{PV}$") is below a high limit of the fuel nozzle tilt ("$TILT_{HIGH}$"), the method includes the step of increasing the $TILT_{PV}$ while maintaining a flow rate of a secondary flue gas recirculation ("$SFGR_{PV}$") constant.

In one embodiment, the step of increasing the $TILT_{PV}$ causes an increase in the $R_{PV}$. In yet another embodiment, the method comprises the step of increasing the $SFGR_{PV}$, if the $R_{PV}$ is less than the $R_{SP}$ and the $TILT_{PV}$ is at the $TILT_{HIGH}$. In yet another embodiment, the step of increasing the $SFGR_{PV}$ causes an increase in the $R_{PV}$. In yet another embodiment, the method includes the step of decreasing the $SFGR_{PV}$ while maintaining the $TILT_{PV}$ constant if the $R_{PV}$ is greater than the $R_{SP}$ and the $SFGR_{PV}$ is greater than a low limit of flow rate of the SFGR ("$SFGR_{LOW}$"). The step of decreasing the $SFGR_{PV}$ causes a decrease in the $R_{PV}$. In one embodiment, the step of decreasing the $SFGR_{PV}$ causes a decrease in an amount of power consumed by an SFGR fan and/or an Induced Draft (ID) fan.

In yet another embodiment, the method includes the step of decreasing the $TILT_{PV}$ if the $R_{PV}$ is greater than the $R_{SP}$ and the $SFGR_{PV}$ is at the $SFGR_{LOW}$. Decreasing the $TILT_{PV}$ causes a decrease in the $R_{PV}$. In yet another embodiment, the method includes the step of determining a biased steam reheat outlet temperature setpoint ("$RB_{SP}$"), wherein the $RB_{SP}$ is the greater of an $RB_{CONSTANT}$ or a K, wherein the K is the $R_{PV}$ less the difference between a measured attemperator inlet steam temperature ("$DI_{PV}$") and a measured attemperator outlet steam temperature ("$DO_{PV}$"). A rate of the increase of the $TILT_{PV}$ is based at least in part on the $RB_{SP}$. In yet another embodiment, a rate of the decrease of the $SFGR_{PV}$ is based at least in part on the $RB_{SP}$.

According to other aspects illustrated herein, there is provided a system for adjusting a measured reheat outlet steam temperature ("$R_{PV}$") to approximate a reheat outlet steam temperature setpoint ("$R_{SP}$") in a steam generating boiler. The system has a furnace. A fuel nozzle is in fluid communication with the furnace and extends into the furnace from a sidewall thereof. The fuel nozzle is configured to deliver fuel to the furnace. The system further includes fuel nozzle tilt control configured to adjust a tilt of fuel nozzle relative to the sidewall ("$TILT_{PV}$"). A source of secondary flue gas recirculation (SFGR) is in fluid communication with the furnace, the source of secondary flue gas, e.g. one or more fans, is configured to deliver secondary flue gas recirculation (SFGR) to the furnace. An SFGR control is configured to adjust a flow rate of SFGR into the furnace ("$SFGR_{PV}$"). A first temperature sensor configured to measure an $R_{PV}$. The system further includes a controller. Software executing on the controller compares the $R_{PV}$ to an $R_{SP}$. If the $R_{PV}$ is less than the $R_{SP}$ and the $TILT_{PV}$ is below a high limit of the fuel nozzle tilt ("$TILT_{HIGH}$"), software executing on the controller generates a signal instructing the fuel nozzle tilt control to increase the $TILT_{PV}$ and software executing on the controller generates a signal instructing the SFGR control to maintain $SFGR_{PV}$ constant.

In yet a further embodiment, the system includes software executing on the controller for, if the $R_{PV}$ is less than the $R_{SP}$ and the $TILT_{PV}$ is at the $TILT_{HIGH}$, generating a signal instructing the SFGR control to increase the $SFGR_{PV}$. In yet a further embodiment, the fuel nozzle tilt control increases the $TILT_{PV}$ in response to the instruction, and the SFGR control increases the $SFGR_{PV}$ in response to the instruction. In yet a further embodiment, the system comprises software executing on the controller for, if the $R_{PV}$ is greater than the $R_{SP}$ and the $SFGR_{PV}$ is greater than a low limit of flow rate of the SFGR ("$SFGR_{LOW}$"), generating a signal instructing the SFGR control to decrease the $SFGR_{PV}$, and for generating a signal instructing the flue nozzle tilt control to maintain the $TILT_{PV}$ constant.

In one embodiment, the SFGR control decreases the $SFGR_{PV}$ in response to the instruction. In yet another embodiment, the decrease in the $SFGR_{PV}$ causes a decrease in an amount of power consumed by an SFGR fan and an ID fan. In yet another embodiment of the present disclosed system, software executing on the controller generates a signal instructing the fuel nozzle tilt control to decrease the $TILT_{PV}$ if the $R_{PV}$ is greater than the $R_{SP}$ and the $SFGR_{PV}$ is at the $SFGR_{LOW}$. In yet another embodiment, the system includes software executing on the controller for determining a biased steam reheat outlet temperature setpoint ("$RB_{SP}$"), wherein $RB_{SP}$ is the greater of an $RB_{CONSTANT}$ or a K, wherein K is the $R_{PV}$ less the difference between a measured attemperator inlet steam temperature ("$DI_{PV}$") and a measured attemperator outlet steam temperature ("$DO_{PV}$"). The rate of the increase of the $TILT_{PV}$ is based at least in part on the $RB_{SP}$. In yet another embodiment, the rate of the decrease of the $SFGR_{PV}$ is based at least in part on the $RB_{SP}$.

The above described and other features are exemplified by the following figures and detailed description.

BRIEF DESCRIPTION OF THE DRAWINGS

Referring now to the figures, which are exemplary embodiments, and wherein the like elements are numbered alike:

FIG. 4 illustrates a secondary flue gas recirculation control loop in accordance with one embodiment of the present disclosure.

DETAILED DESCRIPTION OF THE DISCLOSURE

Figure 1:
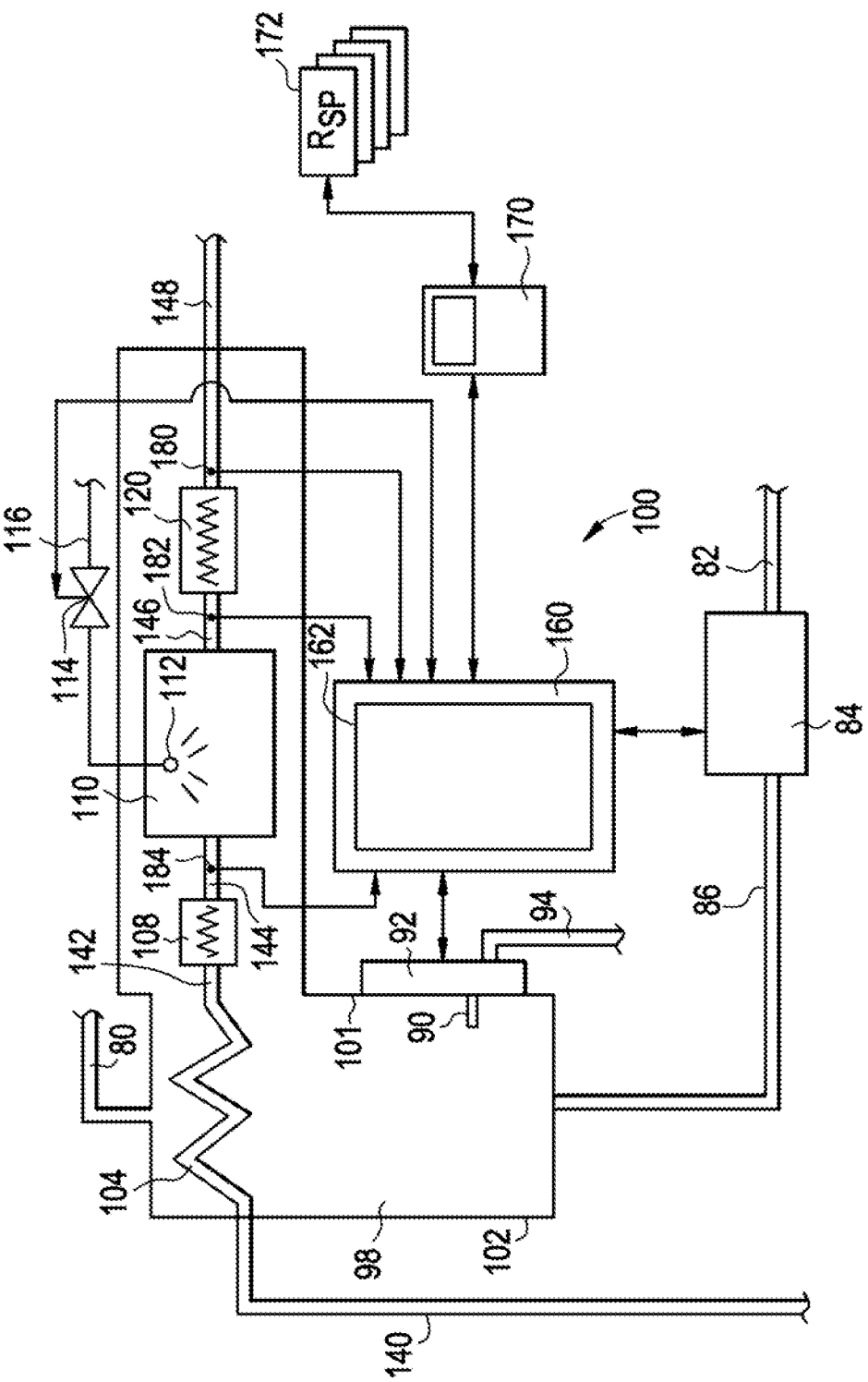
FIG. 1 illustrates a portion of a power plant in accordance with one embodiment of the present disclosure.

FIG. 1 illustrates a block diagram of a boiler steam cycle for a typical boiler 100 that may be used, for example, in a thermal power plant. The boiler 100 may include various sections through which steam or water flows in various forms such as superheated steam, reheated steam, etc. While the boiler 100 shown in FIG. 1 illustrates various boiler sections, in an actual implementation and as can be appreciated by a person of ordinary skill in the art and familiar with this disclosure, one or more additional sections may be included or one or more additional sections may be excluded. As discussed in further detail below, $R_{PV}$ is variable temperature measured in conduit 148 measured by sensor 180. $R_{SP}$ is a set point for temperature of steam at this point in the system.

In the boiler 100, cold reheat steam is returned from a turbine (not shown) to a furnace 102 through conduit 140. The conduit 140 is in fluid communication with a first reheat steam heat absorption section 104 in the furnace 102. The cold reheat steam passes through the first reheat steam heat absorption section 104 where it is heated by combustion in the furnace 102. After the reheat steam is heated in the reheat steam heat absorption section 104 flows through conduit 142, which is in fluid communication with the reheat steam heat absorption section 104. Although a reheat steam heat absorption section 104 is disclosed herein, it should be understood by a person of ordinary skill in the art and familiar with this disclosure that different known systems may be used to transfer heat from the combustion to the working fluid in the boiler 100.

The conduit 142 is in fluid communication with a second reheater 108. During operation the reheat steam passes through the conduit 142 and flows into the second reheater 108. The second reheater 108 is in further fluid communication with an attemperator 110 via conduit 144. The reheat steam flows from the second reheater 108, through the conduit 144, and into the attemperator 110. The attemperator 110 is in fluid communication via conduit 146 with a third reheater 120. The steam flows from the attemperator 110, through the conduit 146, and into the third reheater 120. The third reheater 120 is in fluid communication with conduit 148.

The hot reheat steam exits the third reheater 120 and flows into the conduit 148. Conduit 148 exits the furnace and is in fluid communication with one or more turbines (not shown in the FIGS.). The hot reheat steam flows from the conduit 148 into the one or more turbines causing the turbines to rotate. After the reheat steam exits the one or more turbines, it may flow through more additional elements and conduits (not shown), for example, a main condenser, a feedwater preheat train, a feedwater tank, an economizer, a water wall, multiple superheat steam heat absorption sections, one or more high pressure turbines, etc., after which the reheat steam is returned to conduit 140 and to repeat the cycle. It should be understood that although a specific arrangement of components is disclosed herein, the present disclosure is not limited in this regard and a person having ordinary skill in the art and being familiar with this disclosure will understand that other configurations are possible.

The furnace 102 includes one or more fuel nozzles 90 for delivering fuel to a chamber 98 of the furnace 102, for example pulverized coal, air, flue gas recirculation, and/or substantially pure oxygen. In the embodiment shown in FIG. 1, only one fuel nozzle 90 is shown, although it should be understood that a typical furnace 102 may include multiple sets of nozzles 90 at different elevations in the furnace and, for example, in different corners of the furnace. The fuel nozzle 90 is in fluid communication with a conduit 94 for receiving a mixture of fuel, air, flue gas recirculation flows, and/or substantially pure oxygen. Using a fuel nozzle tilt control 92, it is possible to adjust the angle, commonly referred to as tilt, of the fuel nozzle 90 relative to a wall 101 of the furnace 102 from which the nozzle 90 extends.

In FIG. 1, the nozzle 90 extends perpendicular from the wall 101. The nozzle 90 may be tilted downwards, below horizontal, to a lower limit. Similarly, the nozzle 90 may be tilted upwards, above horizontal, to an upper limit. The fuel nozzle tilt control 92 is in communication with a central controller 160. The fuel nozzle tilt control 92 may receive signals indicative of commands from the central controller 160 regarding the tilt of the fuel nozzle 90. The fuel nozzle tilt control 92 adjusts the tilt of the nozzle 90 accordingly. Similarly, the fuel nozzle tilt control 92 may transmit signals to the central controller 160 indicative of a tilt position of the nozzle 90. While one nozzle 90 is shown, the present disclosure is not limited in this regard as any number of nozzles may be employed. Adjustment of the fuel nozzle tilt alters the distribution of heat in the furnace 102 to affect $R_{PV}$. For example, raising the nozzle 90 above horizontal directs air and fuel to a higher elevation in the furnace, while lowering the nozzle 90 below horizontal directs air and fuel to a lower elevation in the furnace. Through these adjustments, it is possible to control the location of a fireball in the furnace and thereby affect the amount of heat being transferred to the reheat steam. Lowering the fuel nozzle tilt causes a decrease in $R_{PV}$. Raising the fuel nozzle tilts causes an increase in the $R_{PV}$.

As discussed above, after the reheat steam exits the first reheat steam heat absorption section 104, and passes through conduit 142, the second reheater 108, and conduit 144, the reheat steam passes through the attemperator 110. The attemperator 110 may be used to adjust the $R_{PV}$ relative to the setpoint $R_{SP}$. The spray water is injected into the attemperator 110 through injector 112. The water contacts the reheat steam and evaporates thereby reducing the temperature of the steam passing through the attemperator 110, and consequently decreasing $R_{PV}$. Similarly, the attemperator 110 may cause an increase in $R_{PV}$ by decreasing the flow rate of spray water being injected into the attemperator 110.

The spray water injector 112 is in fluid communication with a source of spray water 116. An attemperator spray water control handle, i.e. a flow control valve 114, can be adjusted to control the flow rate of water through the injector 112 and into the attemperator 110. In this manner it is possible to affect the temperature of the reheat steam exiting the attemperator 110 by controlling the valve 114 and thereby adjusting the amount of water being injected into the attemperator 110. The valve 114, which may include an actuator, receives signals indicative of commands for adjusting the flow rate of water through the injector 112 from the central controller 160. The valve 114 adjusts the flow rate accordingly. Similarly, the valve 114 may transmit signals to the central controller 160 indicative of a position of the valve 114 and/or a corresponding flow rate.

In further reference to FIG. 1, the furnace 102 is in fluid communication with conduit 80. Flue gases that are generated during combustion in the chamber 98 of the furnace 102 are exhausted from the furnace through conduit 80. Conduit 80 may be in fluid communication with one or more systems (not shown in the FIGS.) for treating the flue gas. At least a portion of the flue gas may be recirculated back into the furnace 102, which is referred to as secondary flue gas recirculation (SFGR). The secondary flue gas recirculation flow is extracted from conduit 80 and provided to conduit 82 (connection not shown) by a SFGR fan 84. It should be understood to a person having ordinary skill in the art and being familiar with this disclosure that the flue gas may pass through one or more different systems which are not shown in the FIGS. The conduit 82 is in fluid communication with a SFGR flow control handle, for example, one or more fans 84. The fan 84 is in fluid communication with conduit 86 which is in turn in fluid communication with the furnace 102. The fan 84 operates to recirculate secondary flue gas into the furnace 102. Flue gas recirculation is a means of altering the distribution of heat within the furnace 102 to affect the reheat outlet steam temperature $R_{PV}$.

The fan 84 is in communication with the central controller 160. The fan 84 may receive signals indicative of commands for adjusting the flow rate of recirculated flue gas into the furnace 102 from the central controller 160. The fan 84 adjusts the flow rate accordingly. Similarly, the fan 84 may transmit signals to the central controller 160 indicative of an operation of the fan 84 and/or a corresponding flow rate. It should be understood that the conduit 82 may also provide a source of air when the furnace 102 is operating in air-firing mode, thereby enabling the fan 84 to provide an adjustable flow rate of air into to the furnace 102. The fan 84 can cause an increase in $R_{PV}$ by increasing the flow rate of recirculated flue gas into the furnace 102. The fan can cause a decrease in $R_{PV}$ by decreasing the flow rate of recirculated flue gas into the furnace 102.

In reference to FIG. 1, the system 100 includes a central controller 160. The term central controller 160, also referred to as a controller, as used herein, generally refers to one or more devices capable of executing software. As can be appreciated by a person of ordinary skill in the art, many different devices are available for use as a controller 160. For example, one or more processor based computers can be used as a controller. The central controller 160 includes software 162 executing thereon.

The system 100 includes an interface 170 for inputting information indicative of the operating parameters of the system 100 into the central controller 160. The interface 170 may comprise, for example, a touch sensitive display screen, or a display and a keyboard. The interface 170 may further comprise a processor having software executing thereon, or, for example, the interface 170 may be a component of the central controller 160. It should be understood that these examples are not intended to limited the present disclosure, and a person having ordinary skill in the art and being familiar with this disclosure will understand that many different components and configurations thereof are available for use as an interface. The $R_{SP}$ 172, among other data, are examples of operating parameters that can be input into the central controller 160 via the interface 170 and stored in a database (not shown in the FIGS.) in communication with the central controller 160. Although the controller 160 and interface 170 are shown as separate elements in FIG. 1, the present disclosure is not limited in this regard. As can be appreciated by a person of ordinary skill in the art and familiar with this disclosure, the interface 170 may comprise a component of the controller 160. In yet other embodiments, it is not necessary to include an interface 170. In such embodiments, operating parameters for the system 100 can be programmed into the central controller 160, or can be transmitted to the central controller 160 by some other means, for example, a dongle or the like.

The central controller 160 is in communication with one or more sensors for recording different process variables in the system 100, for example different temperatures. The central controller 160 is in communication with a sensor 180 disposed in conduit 148, which is downstream of the third reheater 120. The sensor 180 may be a thermocouple, thermistor, resistance temperature detector (RTD), pyrometer, or any other type of sensor capable of dynamically sensing the temperature of the flue gas passing through the conduit 148. The sensor 180 is positioned to measure $R_{PV}$. The sensor 180 periodically transmits a signal to the central controller 160 indicative of the $R_{PV}$. Temperature sensor 184 is disposed in conduit 144 on the upstream side of the attemperator 110. The sensor 184 is positioned to measure the attemperator 110 inlet steam temperature ("$DI_{PV}$"). The sensor 184 periodically transmits a signal to the central controller 160 indicative of the $DI_{PV}$. Temperature sensor 182 is disposed in conduit 146 on the downstream side of the attemperator 110. The sensor 182 is positioned to measure the attemperator 110 outlet steam temperature ("$DO_{PV}$"). The sensor 182 periodically transmits a signal to the central controller 160 indicative of the $DO_{PV}$.

Based on the information received from the sensors 180, 182, 184 and based on information received on the fuel nozzle tilt control 92, the attemperator spray water control 114, and the SFGR control 84, software executing on the central controller 160 can be used to generate instructions for controlling the fuel nozzle tilt control 92, the attemperator spray water control 114, and the SFGR control 84 to adjust $R_{PV}$ and minimize deviations from $R_{SP}$.

It is desired to minimize use of attemperator 110, and more specifically the flow rate of spray water through the injector 112, because, although it is an effective control for rapidly adjusting the $R_{PV}$, usage of the spray water in the attemperator 110 is also inefficient. It is preferred to use the fuel nozzle tilt control 92 or the SFGR control 84 because these controls may be more efficient. The determination of the priority of these control variables is based on minimizing the power consumed by the SFGR control 84, specifically the power consumed by the fan. For example, in a scenario in which the $R_{PV}$ needs to be raised, i.e. $R_{PV}$ is below $R_{SP}$, in the oxy-firing mode, the fuel nozzle tilt is raised until it reaches a high limit. After the fuel tilt reaches its high limit, and assuming $R_{PV}$ is still below $R_{SP}$, the flow rate of secondary flue gas is increased via the fan 84. In another scenario, the $R_{PV}$ is above the $R_{SP}$ and accordingly needs to be lowered to minimize deviations from the $R_{SP}$. In this scenario, the flow rate of the secondary flue gas recirculation is decreased via the fan 84 until it reaches a low limit. Assuming the $R_{PV}$ is still above the $R_{SP}$, the fuel nozzle tilt is tilted down. This control priority arrangement allows the minimization of the total fan power consumption.

Figure 2:
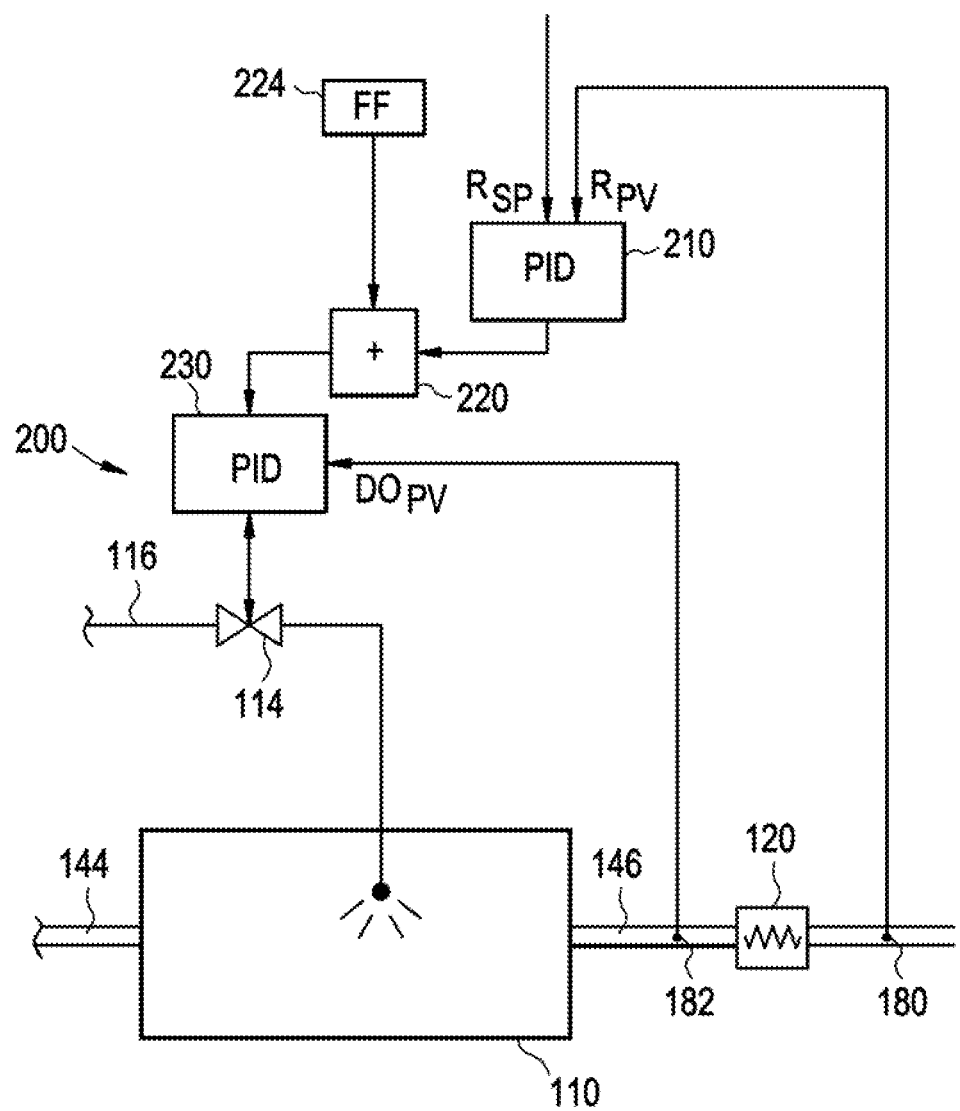
FIG. 2 illustrates an attemperator control loop in accordance with one embodiment of the present disclosure.
Figure 3:
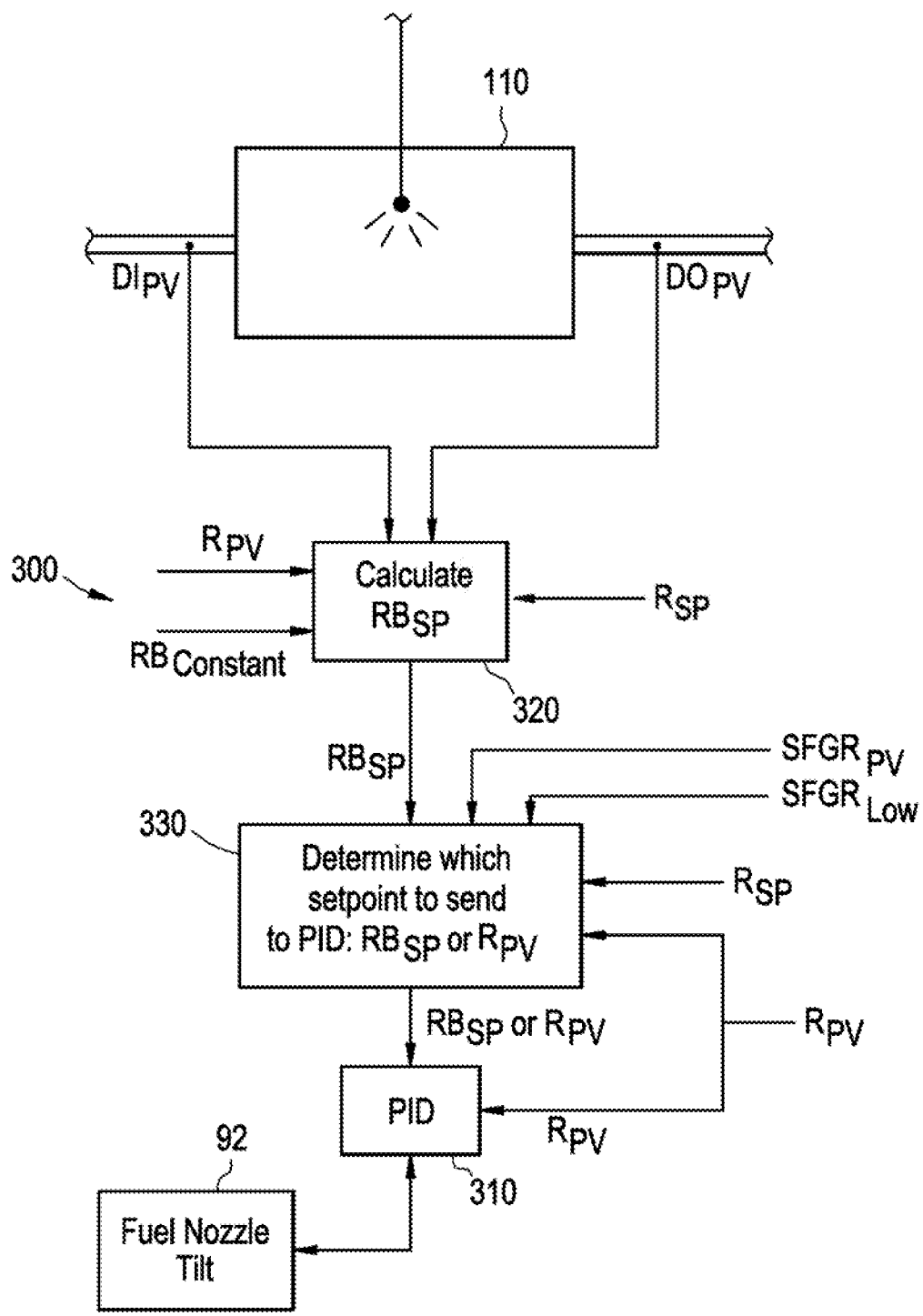
FIG. 3 illustrates a fuel nozzle tilt control loop in accordance with one embodiment of the present disclosure.

The following paragraphs describe the realization of the control logics for controlling the $R_{PV}$ relative to the $R_{SP}$ in an oxy-fired boiler system 100 as shown in FIG. 1. The control system 100 comprises three closed-loop proportional-integral-derivative ("PID") controls: (1) attemperator spray water control loop (FIG. 2); (2) fuel nozzle tilts control loop (FIG. 3); (3) SFGR control loop (FIG. 4). It should be understood that although the three PID control loops are illustrated in different Figures and may appear to operate using different hardware, the PID control loops may execute as software 162 on the controller 160. A person of ordinary skill in the art and familiar with this disclosure will understand that the present disclosure is not limited to the software and hardware configurations disclosed herein for carrying out the disclosed control logic and that many different configurations may be used with the present disclosure. As further illustrated in FIGS. 2-4, and as discussed below, the system 100 relies on open loop selections logics to prioritize the operations of the three manipulated variables.

FIG. 2 illustrates a control loop 200 for the attemperator 110. The control loop 200 includes a first control block 210 (illustrated in the form of a PID control block) which uses as inputs $R_{SP}$ and $R_{PV}$. The first PID 210 provides an output to a summer block 220. The first PID 210 output is modified by a feedforward signal ("FF") 224 at the summer block 220. The feedforward signal 224 may be generated by software executing on the central controller 160 by calculating the difference between a rate of change of a main steam flow and a total corrected fuel flow. The first step is to subtract the rate of change of the corrected fuel flow from the rate of change of the main steam flow. This calculated difference forms the feedforward signal 224, which is added to the setpoint of the second PID controller 230. If the difference is positive, this suggests the furnace 102 is underfiring (i.e. the relative amount of fuel flow tends to be lower than the steam flow), then the feedforward signal will be positive, and compensate the underfiring effect. If the difference is negative, this suggests the furnace 102 is overfiring (i.e. the relative amount of fuel flow tends to be higher than the steam flow), then the feedforward signal will be negative, and compensate for the overfiring effect.

The summer block 220 provides a master output to a second PID 230 (also referred to as a slave controller). The second PID controller 230 acts on the master output and $DO_{PV}$ to generate a signal indicative of valve position corresponding to a specific flow rate of water into the attemperator 110. The signal is transmitted to the attemperator spray water control valve 114, which is adjusted accordingly. If $DO_{PV}$ is greater than the master output, the second PID controller 230 generates a signal instructing the valve 114 to bias open, thereby causing an increase in the flow rate of water into the attemperator 110, which will cause a decrease in $R_{PV}$. If, on the other hand, $DO_{PV}$ is less than the master output $R_{PV}$, the second PID controller 230 generates a signal instructing the valve 114 to bias closed, thereby causing a decrease in the flow rate of water into the attemperator 110, which will cause in increase in $R_{PV}$.

FIG. 3 illustrates a control loop 300 for the fuel nozzle tilt control 92. Commands for the fuel nozzle tilt control 92 are developed by a PID controller 310 acting on a biased steam reheat outlet temperature set point ("$RB_{SP}$") and $R_{PV}$. First, at block 320, software executing on the central controller 160 (not shown in FIG. 3) calculates the $RB_{SP}$ based on $R_{PV}$, $R_{SP}$, $DI_{PV}$, $DO_{PV}$, and a biased steam reheat outlet temperature constant ("$RB_{CONSTANT}$") which may be received via interface 170. Using the $RB_{SP}$, the $R_{SP}$ is biased down by the attemperator differential temperature ($DI_{PV}$–$DO_{PV}$) limited by the constant $RB_{CONSTANT}$ for the purpose of forcing the reheat spray water control valves to close in the long term. $RB_{SP}$ is calculated as follows:

$$K = R_{PV} - (DI_{PV} - DO_{PV})$$

If $K \geq RB_{CONSTANT}$ then $RB_{SP} = K$
If $K < RB_{CONSTANT}$ then $RB_{SP} = RB_{CONSTANT}$ Next, at block 330, software executing on the central controller 160 determines whether to send $RB_{SP}$ or $R_{PV}$ to the PID controller 310 as the first variable ($R_{PV}$ will be sent to PID control 310 as second variable regardless of this determination) based on $R_{PV}$, $R_{SP}$, the flow rate of the SFGR ("$SFGR_{PV}$"), and the low limit of flow rate of the SFGR ("$SFGR_{LOW}$"). The determination of the first variable is made as follows:

If $R_{PV} > R_{SP}$ and $SFGR_{PV} > SFGR_{LOW}$ then send $R_{PV}$
Otherwise send $RB_{SP}$ The PID controller 310 acts on the first variable provided by the determination block 330, either $R_{PV}$ or $RB_{SP}$, and the second variable $R_{PV}$, to generate a signal indicative of fuel nozzle tilt position. The signal is transmitted to the fuel nozzle tilt control 82, which adjusts the tilt position of the nozzle 90 accordingly.

The selector logic illustrated in FIG. 3 and discussed above controls priority of the fuel nozzle tilt control 92 versus the SFGR flow demand to minimize the use of the attemperator 110 and the power consumption of the fan 84. The following scenarios illustrate the fuel tilt loop. When $R_{PV}$ is greater than $R_{SP}$ and the $SFGR_{PV}$ is greater than $SFGR_{LOW}$, the selector logic forces the fuel nozzle tilts PID controller to select $R_{PV}$ as first variable. As the PID controller 310 acts on second variable $R_{PV}$, the tilts will not react because the PID 310 is acting on the difference between $R_{PV}$ and $R_{PV}$ (the first and second variables, respectively). This selection causes the central controller 160 to further reduce the $SFGR_{PV}$ to $SFGR_{LOW}$ (as further illustrated in FIG. 4 and the accompanying text). This reduces power consumption by fan 84 because it works less to generate the lower flow rate. This action simultaneously causes a reduction in $R_{PV}$ as a result of the decreased $SFGR_{PV}$. After $SFGR_{LOW}$ is reached, and thus there is no more potential for conserving power from the fan 84, determination block 330 sends $RB_{SP}$ to the PID 310 as the first variable. The PID controller 310 subsequently acts on the difference between $RB_{SP}$ and $R_{PV}$. The fuel nozzle tilts position will keep decreasing and consequently the $R_{PV}$ will decrease. As a result, the attemperator spray water control valve 114 will reduce the flow rate of water into the attemperator 110 to maintain $R_{PV}$. The fuel nozzle tilts control 92 will continue to cause the closing of the spray water control valve 114 until the fuel nozzle tilts reach a low limit or the spray water control valve 114 is fully closed.

FIG. 4 illustrates a control loop 400 for adjusting the fan 84 for controlling the flow rate of SFGR ("$SFGR_{PV}$"). First, at block 420, software executing on the central controller 160 (not shown in FIG. 4) determines whether to send $RB_{SP}$, as calculated in the flow loop shown in FIG. 3, or $R_{PV}$ to the first PID controller 410 ($R_{PV}$ will be sent to first PID control 410 as second variable regardless of this determination) based on $R_{PV}$, $R_{SP}$, the position of the fuel nozzle tilt ("$TILT_{PV}$"), and the high limit of the fuel nozzle tilt ("$TILT_{HIGH}$"). The determination of the first variable is made as follows:

If $R_{PV} > R_{SP}$ then send $RB_{SP}$.
If $R_{PV} < R_{SP}$ and $TILT_{PV} < TILT_{HIGH}$ then send $R_{PV}$.
If $R_{PV} < R_{SP}$ and $TILT_{PV} = TILT_{HIGH}$ then send $RB_{SP}$.

The first PID controller 410 acts on the first variable provided by determination block 420, either $RB_{SP}$ or $R_{PV}$, and the second variable $R_{PV}$. The first PID 410 provides an output to a summer block 440. The first PID 410 output is modified by a SFGR flow demand set point 444 at the summer block 440. The summer block 440 provides a master output to a second PID 470 (also referred to as a slave controller). The second PID 470 acts on the master output and $SFGR_{PV}$ to generate a signal indicative of the flow rate of the fan 84 providing the SFGR to the furnace 102. The signal is transmitted to the fan, which is adjusted accordingly.

The control loop 400 is designed to arrange the control priority of the fuel nozzle tilt control versus the SFGR control to minimize power consumption by the fan 84. The following scenarios illustrate the SFGR control loop 400. If the $R_{PV}$ is greater than $R_{SP}$, the first PID controller 410 uses $RB_{SP}$ as the first variable and $R_{PV}$ as the second variable, thereby generating a signal instructing the fan 84 to reduce the $SFGR_{PV}$ and consequently decreasing $R_{PV}$. In the meantime, the fuel nozzle tilt control loop 300 will not adjust the tilt of the fuel nozzle until $SFGR_{PV}=SFGR_{LOW}$. When $R_{PV}$ is less than $R_{SP}$, and $TILT_{PV}<TILT_{HIGH}$, the selector logic forces the first PID controller 410 to select $R_{PV}$ as the first variable. As the first PID controller 410 acts on second variable $R_{PV}$, the $SFGR_{PV}$ will not react because the PID 410 is acting on the difference between $R_{PV}$ and $R_{PV}$ (the first and second variables, respectively). This selection causes the central controller 160 to further increase the $TILT_{PV}$ to $TILT_{HIGH}$. This conserves power consumption by the fan 84 because the fuel nozzle tilt control 82 is used to increase $R_{PV}$, as opposed to increasing $SFGR_{PV}$. If $R_{PV}$ is still less than $R_{SP}$ when $TILT_{PV}$ reaches $TILT_{HIGH}$, the first PID controller uses $RB_{SP}$ as the first variable, thereby generating a signal indicating an increase flow rate of the fan 84 to increase the flow rate of the $SFGR_{PV}$, and thereby increase $R_{PV}$.

During the transition from air-firing mode to oxy-firing mode, the flow rate of air into the furnace 102 and $SFGR_{PV}$ into the furnace 102 may be coordinated to provide a stable transition and operation. Under these circumstances, the related control loops for the SFGR 400 and the air flows (not shown) may be switched to a manual mode so that they do not interfere with the transition operations. Meanwhile, the fuel nozzle tilts control loop 200 may act on the actual $R_{PV}$ as opposed to the $RB_{SP}$. With these operation control logics, the fuel nozzle tilt controller 92 will react to maintain $R_{SP}$ whenever $R_{PV}$ temperature deviates from $R_{SP}$ transition operations. In other words, during transition between air-firing to oxy-firing operations, the excess air level and the flue gas recirculation flow will not be used to control the $R_{PV}$. The attemperator spray water control valve 114 and the fuel nozzle tilts 92 respond to the $R_{PV}$ deviations during the entire transition operations. In addition, the controller parameters for the above mentioned PID controllers in the air-firing mode and the oxy-firing mode may need to be tuned respectively.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of adjusting a measured steam reheat outlet temperature ("$R_{PV}$") to approximate a steam reheat outlet temperature setpoint ("$R_{SP}$") in a dual-mode air and oxy-fired steam generating boiler having a furnace with a fuel nozzle which generates a flue gas, comprising:
   operating a furnace in one of an air-fired mode and an oxy-fired mode;
   comparing an $R_{PV}$ to an $R_{SP}$;
   if the $R_{PV}$ is less than the $R_{SP}$ and a position of the fuel nozzle tilt ("$TILT_{PV}$") is below a high limit of the fuel nozzle tilt ("$TILT_{HIGH}$") increasing the $TILT_{PV}$ to increase the $R_{PV}$ prior to changing a flow rate of a secondary flue gas recirculation ("$SFGR_{PV}$") recirculated back to the furnace;
   if the $R_{PV}$ is less than the $R_{SP}$ and the $TILT_{PV}$ is at the $TILT_{HIGH}$ after increasing the $TILT_{PV}$, then increasing the $SFGR_{PV}$ to increase the $R_{PV}$;
   if the $R_{PV}$ is greater than the $R_{SP}$ and the $SFGR_{PV}$ is greater than a low limit of flow rate of the SFGR ("$SFGR_{LOW}$"), decreasing the $SFGR_{PV}$ to decrease the $R_{PV}$ prior to changing the $TILT_{PV}$; and
   if the if the $R_{PV}$ is still greater than the $R_{SP}$ and the $SFGR_{PV}$ is at the $SFGR_{LOW}$ after decreasing the $SFGR_{PV}$, then decreasing the $TILT_{PV}$ to decrease the $R_{PV}$.

2. The method of claim 1, wherein the decreasing the $SFGR_{PV}$ causes a decrease in an amount of power consumed by a fan.

3. The method of claim 1, further comprising prioritizing control of at least one of an attemperator spray water control, fuel nozzle tilts control, and SFGR control loop based on at least one closed-loop proportional-integral-derivative ("PID") control.

4. A method of adjusting a measured steam reheat outlet temperature ("$R_{PV}$") to approximate a steam reheat outlet temperature setpoint ("$R_{SP}$") in a steam generating boiler having a furnace with a fuel nozzle which generates a flue gas, the method comprising:
   comparing the $R_{PV}$ to the $R_{SP}$;

if the $R_{PV}$ is less than the $R_{SP}$ and a position of a fuel nozzle tilt ("$TILT_{PV}$") is below a high limit of the fuel nozzle tilt ("$TILT_{HIGH}$"), then:

first increasing the $TILT_{PV}$ to increase the $R_{PV}$ while maintaining a flow rate of a secondary flue gas recirculation ("$SFGR_{PV}$") recirculated back to the furnace constant;

if the $R_{PV}$ remains less than the $R_{SP}$ and the $TILT_{PV}$ is at the $TILT_{HIGH}$ after increasing the $TILT_{PV}$, only then increasing the $SFGR_{PV}$ to increase the $R_{PV}$; and if the $R_{PV}$ is greater than the $R_{SP}$ and the $SFGR_{PV}$ is greater than a low limit of flow rate of the SFGR ("$SFGR_{LOW}$"), then:

first decreasing the $SFGR_{PV}$ to decrease the $R_{PV}$ prior to changing the $TILT_{PV}$; and if the if the $R_{PV}$ is still greater than the $R_{SP}$ and the $SFGR_{PV}$ is at the $SFGR_{LOW}$ after decreasing the $SFGR_{PV}$, then decreasing the $TILT_{PV}$ to decrease the $R_{PV}$.

5. The method of claim 4, wherein the decreasing the $SFGR_{PV}$ causes a decrease in an amount of power consumed by a fan.

6. The method of claim 4, further comprising prioritizing control of at least one of an attemperator spray water control, fuel nozzle tilts control, and SFGR control loop based on at least one closed-loop proportional-integral-derivative ("PID") control.

* * * * *